(12) United States Patent
Burgess

(10) Patent No.: US 7,454,272 B1
(45) Date of Patent: Nov. 18, 2008

(54) GEOSTATIONARY STATIONKEEPING METHOD

(75) Inventor: Jeffrey S. Burgess, Denver, CO (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/423,893

(22) Filed: Jun. 13, 2006

Related U.S. Application Data

(60) Provisional application No. 60/711,206, filed on Aug. 25, 2005.

(51) Int. Cl.
G05D 1/00 (2006.01)
G05D 3/00 (2006.01)
G06F 17/00 (2006.01)

(52) U.S. Cl. ............ 701/13; 701/226; 244/158.1; 244/158.8; 244/158.5; 244/158.6; 244/167; 342/352; 342/355; 342/356; 342/358

(58) Field of Classification Search ........... 701/13, 701/226; 356/139.01, 139.03, 139.04; 224/158.1, 224/158.4, 158.5, 158.6, 158.8, 167; 342/352, 342/355, 355.356, 357.06, 357.15, 357.16, 342/358; 398/121; 455/12.1
See application file for complete search history.

(56) References Cited

U.S. PATENT DOCUMENTS

| | | | | |
|---|---|---|---|---|
| 3,516,623 A | * | 6/1970 | Sinden | 244/169 |
| 3,681,583 A | * | 8/1972 | Kubo et al. | 701/30 |
| 4,767,084 A | * | 8/1988 | Chan et al. | 244/164 |
| 5,026,746 A | * | 6/1991 | Floyd et al. | 524/50 |
| 5,054,719 A | * | 10/1991 | Maute | 244/164 |
| 5,108,050 A | * | 4/1992 | Maute | 244/171 |
| 5,263,666 A | * | 11/1993 | Hubert et al. | 244/171.3 |
| 5,267,167 A | * | 11/1993 | Glickman | 701/226 |
| 5,400,252 A | * | 3/1995 | Kazimi et al. | 701/13 |
| 5,641,134 A | * | 6/1997 | Vatt | 455/12.1 |
| 5,687,084 A | * | 11/1997 | Wertz | 701/226 |
| 5,806,802 A | * | 9/1998 | Scott | 244/172.4 |
| 5,813,633 A | * | 9/1998 | Anzel | 244/169 |
| 5,826,831 A | * | 10/1998 | Anzel | 244/169 |
| 5,947,421 A | * | 9/1999 | Beattie et al. | 244/171.1 |
| 5,957,409 A | * | 9/1999 | Castiel et al. | 244/158.4 |
| 5,957,982 A | * | 9/1999 | Hughes et al. | 701/13 |
| 5,971,324 A | * | 10/1999 | Williams et al. | 244/158.4 |
| 6,015,116 A | * | 1/2000 | Anzel et al. | 244/169 |
| 6,019,318 A | * | 2/2000 | Cellier et al. | 244/158.4 |
| 6,032,904 A | * | 3/2000 | Hosick et al. | 244/169 |
| 6,042,058 A | * | 3/2000 | Anzel | 244/164 |
| 6,089,507 A | * | 7/2000 | Parvez et al. | 244/158.8 |
| 6,126,116 A | * | 10/2000 | Cellier | 244/158.4 |

(Continued)

*Primary Examiner*—Khoi H. Tran
*Assistant Examiner*—Jorge O Peche
(74) *Attorney, Agent, or Firm*—Baker Botts L.L.P.

(57) ABSTRACT

According to one embodiment of the invention, a stationkeeping method for a geostationary satellite includes determining a gravitational force of the sun on the satellite at a beginning of a stationkeeping operation and a gravitational force of the moon on the satellite at the beginning of the stationkeeping operation. An initial inclination vector of the satellite is determined at the beginning of the stationkeeping operation that accounts for a first set of one or more perturbations affecting the orbit of the satellite. A maneuver strategy is determined to correct for a second set of one or more perturbations affecting the orbit of the satellite without accounting for the first set of one or more perturbations affecting the orbit of the satellite. Finally, a maneuver is performed on the satellite according to the maneuver strategy.

20 Claims, 10 Drawing Sheets

U.S. PATENT DOCUMENTS

| | | | |
|---|---|---|---|
| 6,128,575 A * | 10/2000 | Croom et al. | 701/226 |
| 6,135,394 A * | 10/2000 | Kamel et al. | 244/158.8 |
| 6,198,990 B1 * | 3/2001 | Croom et al. | 701/13 |
| 6,223,019 B1 * | 4/2001 | Briskman et al. | 455/12.1 |
| 6,305,646 B1 * | 10/2001 | McAllister et al. | 244/158.8 |
| 6,439,507 B1 * | 8/2002 | Reckdahl et al. | 244/158.8 |
| 6,564,053 B1 * | 5/2003 | Briskman et al. | 455/427 |
| 6,695,259 B1 * | 2/2004 | Maeda et al. | 244/158.4 |
| 2003/0146349 A1 * | 8/2003 | Maeda et al. | 244/158 R |
| 2004/0176883 A1 * | 9/2004 | Belbruno | 701/13 |
| 2005/0178918 A1 * | 8/2005 | Maeda et al. | 244/158 R |
| 2006/0016934 A1 * | 1/2006 | Sharer | 244/158.4 |

* cited by examiner

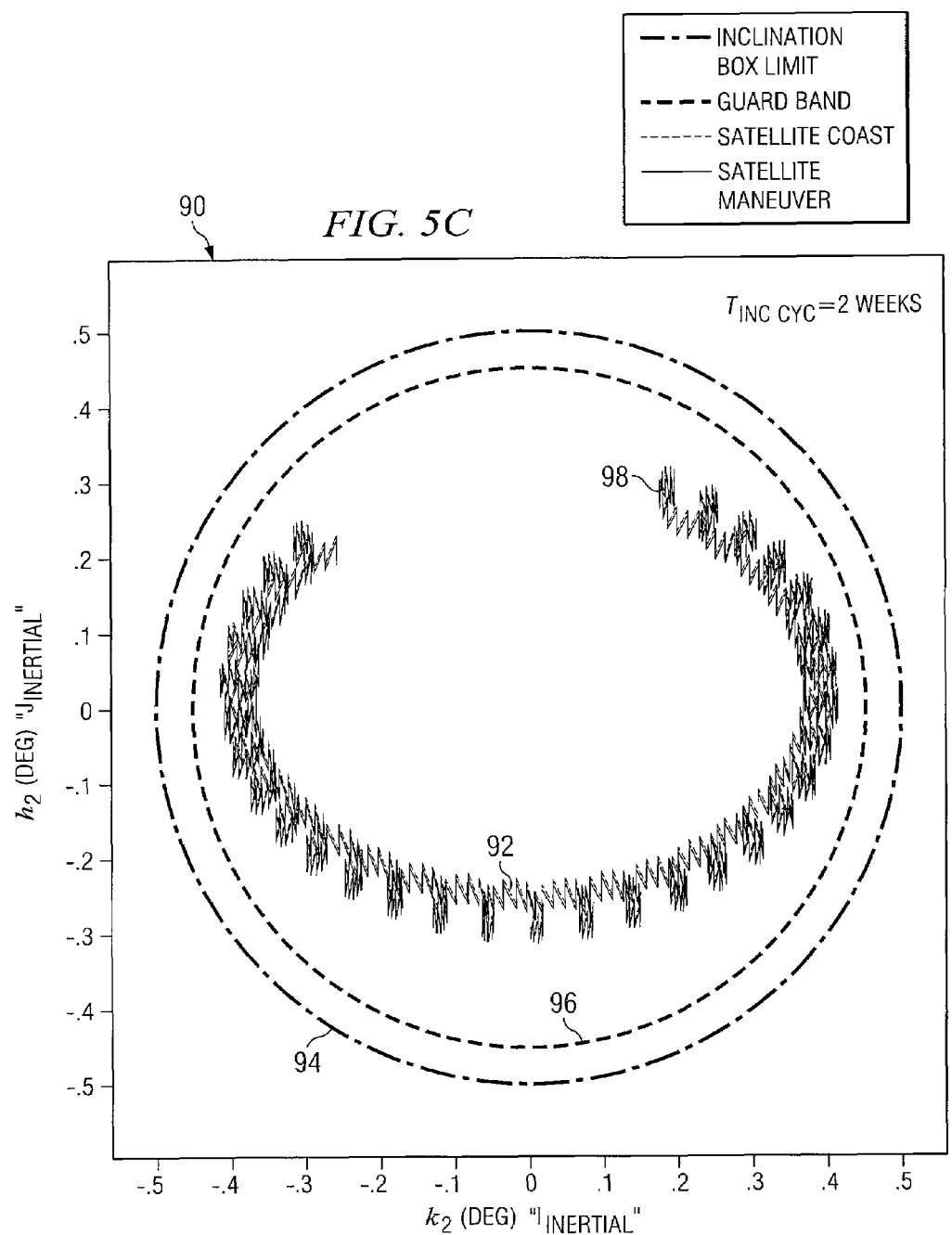

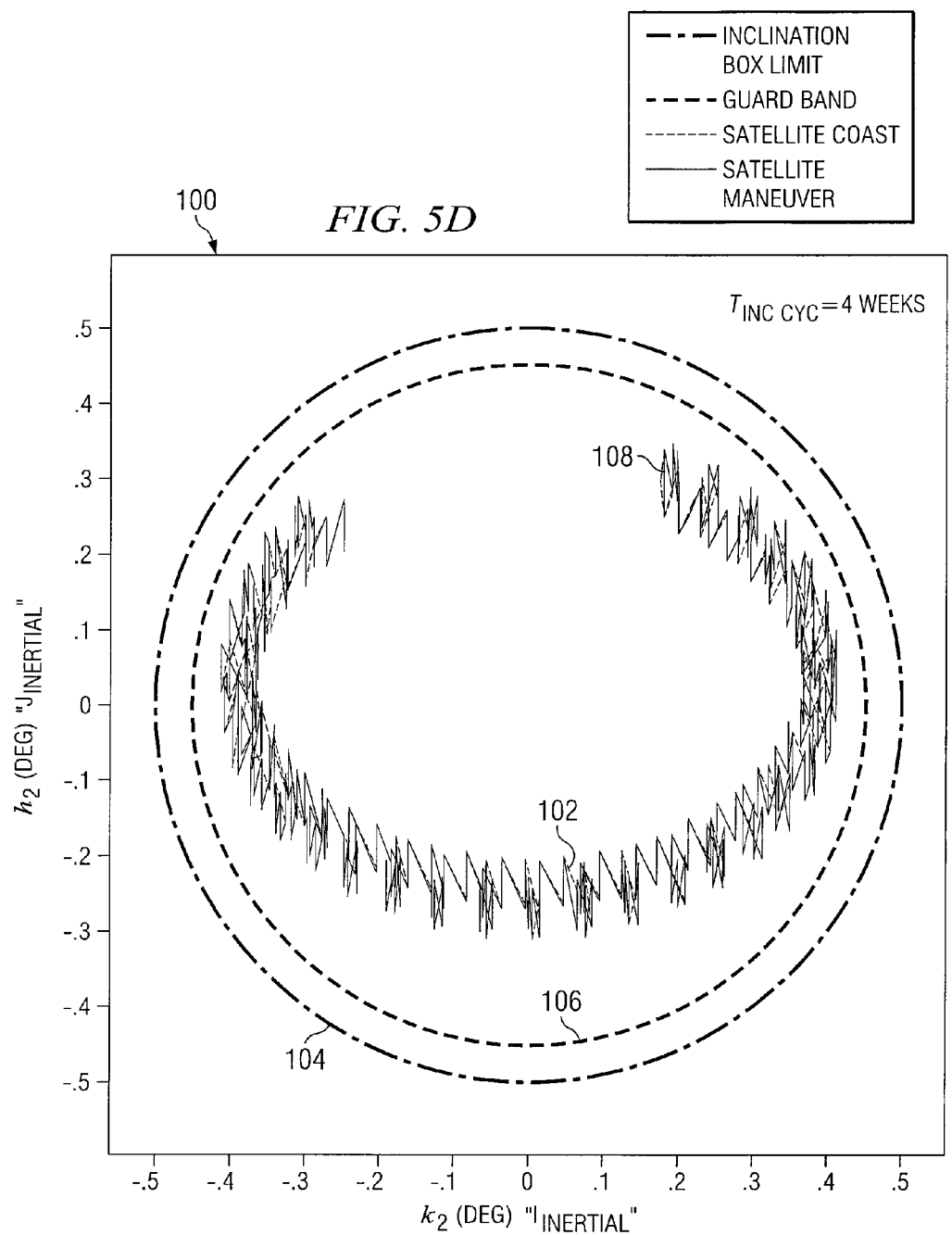

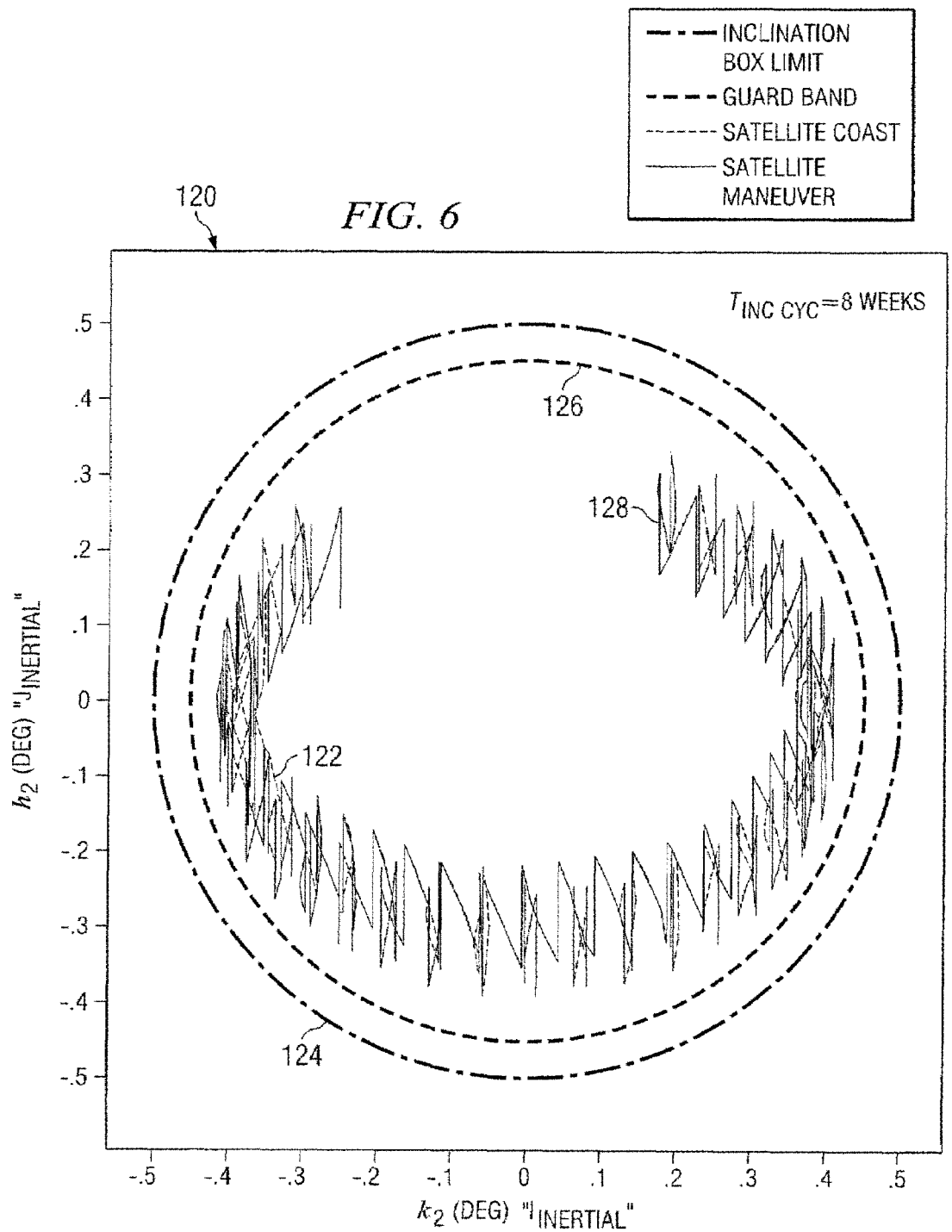

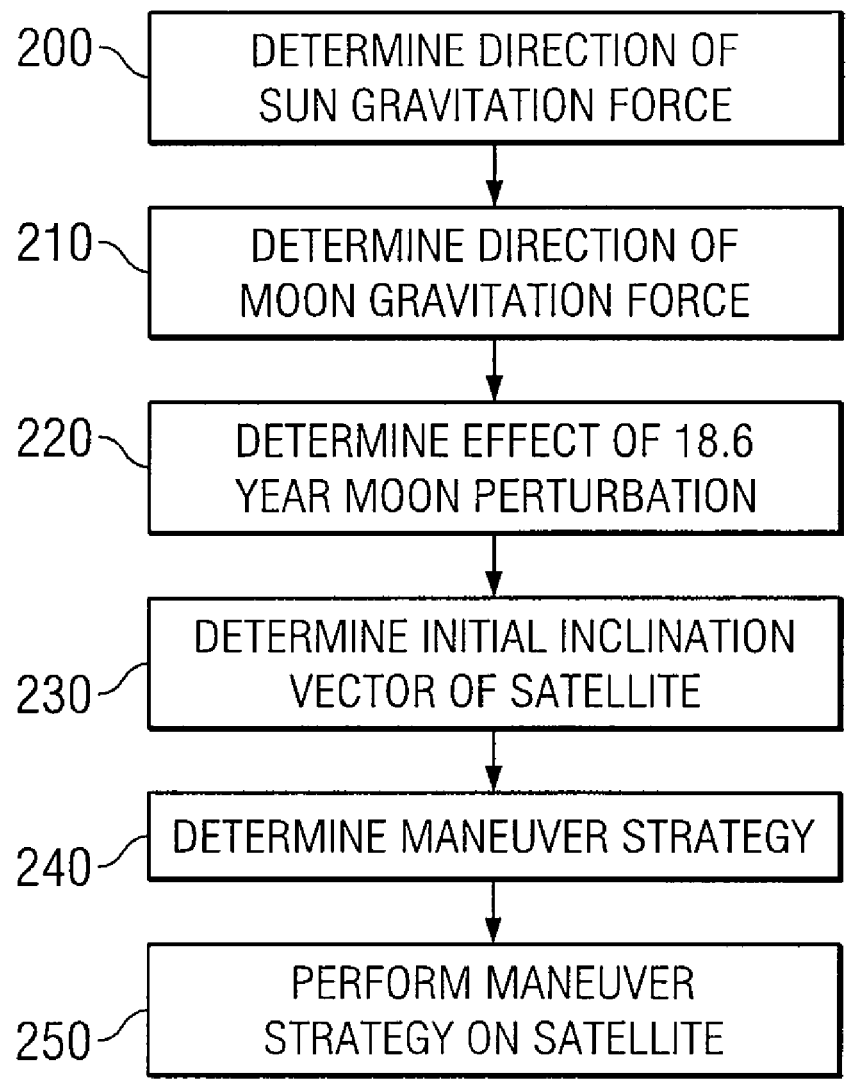

GEOSTATIONARY STATIONKEEPING METHOD

CROSS REFERENCE

This application claims the benefit of U.S. provisional application entitled "Geostationary Stationkeeping System and Method for a 0.5 Degree Inclination Box," filed Aug. 25, 2005, and having a Ser. No. 60/711,206.

GOVERNMENT RIGHTS

This invention was made with Government support under Contract No. DG133E04CN0009. The government may have certain rights in this invention.

TECHNICAL FIELD OF THE INVENTION

This invention relates generally to the field of space satellites and, more particularly, to a method of stationkeeping geostationary satellites.

BACKGROUND OF THE INVENTION

Geostationary satellites are popular and are used to accomplish many tasks. One problem with geostationary satellites is that their orbits degrade over time because of various external forces, such as the gravitational forces of the sun and the moon. To correct this degradation, the geostationary satellite must use approximately 90% of its fuel allotted for stationkeeping for North/South (N-S) stationkeeping.

As satellite missions have grown more popular, it has been a goal to extend the lifetime of satellites. Because the lifetime of a satellite depends upon how long its supply of fuel lasts, if the amount of fuel used for N-S stationkeeping can be minimized, then the saved fuel may be used to extend the life of the satellite. Alternatively, the saved fuel can be removed from the satellite, thereby reducing the overall launch mass of the satellite, allowing more payload to be added to the satellite.

SUMMARY OF THE INVENTION

According to one embodiment of the invention, a stationkeeping method for a geostationary satellite includes determining a gravitational force of the sun on the satellite at a beginning of a stationkeeping operation and a gravitational force of the moon on the satellite at the beginning of the stationkeeping operation. An initial inclination vector of the satellite is determined at the beginning of the stationkeeping operation that accounts for a first set of one or more perturbations affecting the orbit of the satellite. A maneuver strategy is determined to correct for a second set of one or more perturbations affecting the orbit of the satellite without accounting for the first set of one or more perturbations affecting the orbit of the satellite. Finally, a maneuver is performed on the satellite according to the maneuver strategy.

Certain embodiments of the invention may provide numerous technical advantages. For example, a technical advantage of one embodiment may include minimizing the amount of fuel used for geostationary stationkeeping operations resulting in longer satellite lifetimes and/or a reduction in the overall launch mass of the satellite.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which:

FIGS. 5A, 5B, 5C, 5D, and 5E are a series of graphs of the mean motion of the satellite over time resulting from the long period gravitational effects of the sun and moon when inclination corrections are applied in a variety of time intervals;

FIG. 6 is a graph of the mean motion of the satellite over time resulting from the long period gravitational effects of the sun and moon when inclination corrections are applied every eight weeks and the inclination vector of the satellite is optimally selected; and FIG. 7 is a flow chart of the steps of the preferred embodiment of the geostationary stationkeeping method performed by a computer.

DETAILED DESCRIPTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

Although the present invention is discussed below in connection with a satellite orbiting the Earth, one skilled in the art will recognize that the present invention can be applied to any space craft, including a space shuttle, that orbits a body in space.

Figure 1:
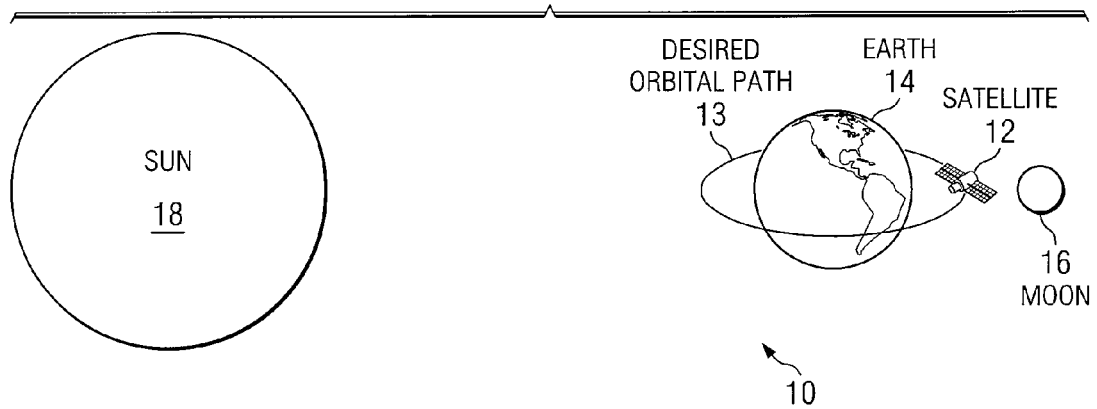
FIG. 1 is a schematic diagram of a geostationary satellite operational environment for a geostationary satellite orbiting the Earth.

FIG. 1 is a schematic diagram of a geostationary satellite operational environment 10 for a geostationary satellite 12 orbiting the Earth 14. The satellite 12 can have a desired orbital path 13. In one embodiment of the invention, the desired orbital path 13 can be in the equatorial plane of the Earth 14. The geostationary satellite operational environment 10 can also include the moon 16 which imparts a gravitational force upon the satellite 12 with contributions that have different periods, including daily, monthly, 18.6 year, and long period (also referred to as a secular contribution). The satellite operational environment 10 can also include the sun 18, which imparts a gravitational force upon the satellite 12 with contributions that have different periods, including daily, yearly, and long period.

The gravitational forces of the sun 18 and moon 16 have the effect of perturbing the inclination of the satellite 12 and the ascending node, thereby removing the satellite 12 from the desired orbital path 13. Because it is often difficult to keep the satellite 12 precisely within the desired orbital path 13, the satellite 12 may be allowed to diverge from the desired orbital path 13 up to a predetermined limit. This range of allowed divergence from the desired orbital path 13 is circumscribed by the inclination box, which will be more fully discussed in connection with FIG. 4.

In order to keep the satellite 12 within the inclination box, the satellite 12 must correct for the effects of the aforementioned gravitational forces of the sun 18 and moon 16 through N-S stationkeeping. N-S stationkeeping can involve the use of a chemical, ion, or other propulsion system located on the satellite 12. Such N-S stationkeeping systems carry out their stationkeeping objectives by utilizing fuel. Conventional methods of geostationary stationkeeping utilize a great deal of fuel to correct for the moon's 18.6 year gravitational effect along with the long period gravitational effects of the sun and the moon on the satellite 12. In the present invention, by optimally initializing the inclination of the satellite 12, only the long period gravitational effects of the sun and moon must be corrected, thereby providing a more fuel-efficient method for maintaining the satellite 12 in an inclination box. Additional details are disclosed below in FIGS. 2-7.

Figure 2:
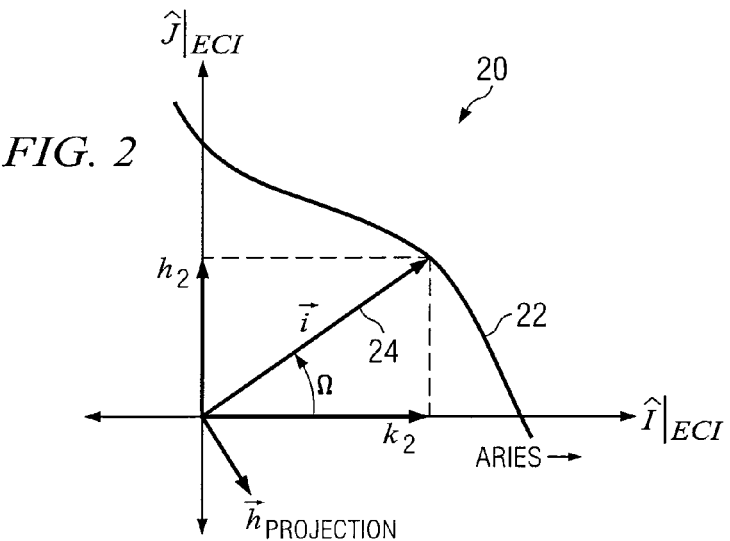
FIG. 2 is a graph of the inclination vector of the satellite over time.

FIG. 2 is a graph 20 of the inclination vector of the satellite 12 over a period of time. The graph 20 consists of a line 22 that is a plot of the inclination vector of the satellite 12 over a period of time. The inclination vector of the satellite 12 is a vector in the direction of the ascending node of the orbit of the satellite 12 that has the magnitude of the inclination of the orbit of the satellite 12. The graph 20 illustrates the inclination vector 24 at a certain point in time. Inclination vector 24 can be mapped in $(k_2, h_2)$ space, for convenience, as follows: (1) $k_2 = i \cos \Omega$ and (2) $h_2 = i \sin \Omega$, wherein i is the magnitude of the inclination of the satellite and $\Omega$ is the angle comprising the right ascension of the ascending node.

Figure 3:
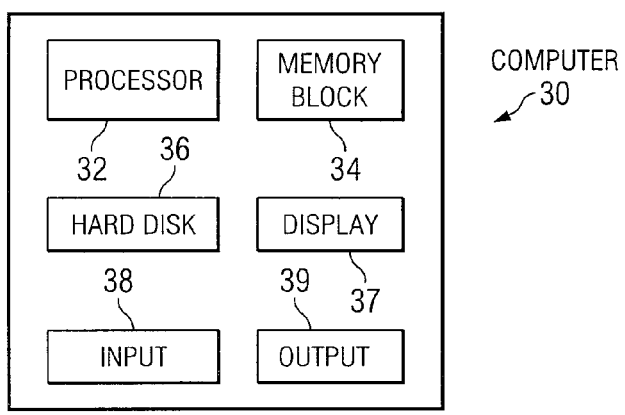
FIG. 3 is a block diagram of a computer for controlling the satellite.

FIG. 3 is a block diagram of a computer 30 for controlling the satellite 12. The computer 30 may include a processor 32, a memory block 34, a hard disk 36, a display 37, an input 38, and an output 39. In one embodiment, computer 30 controls the satellite 12 through an orbit correction application 35 stored in memory block 34, and the orbit correction application 35 performs the steps of the invention that are described later in connection with FIGS. 4-7. The computer 30 can be located either on the Earth 14 or on the satellite 12. As is known to those skilled in the art, if the computer 30 is located on the Earth 14, the computer 30 can communicate with the satellite 12 via wireless means.

Figure 4A:
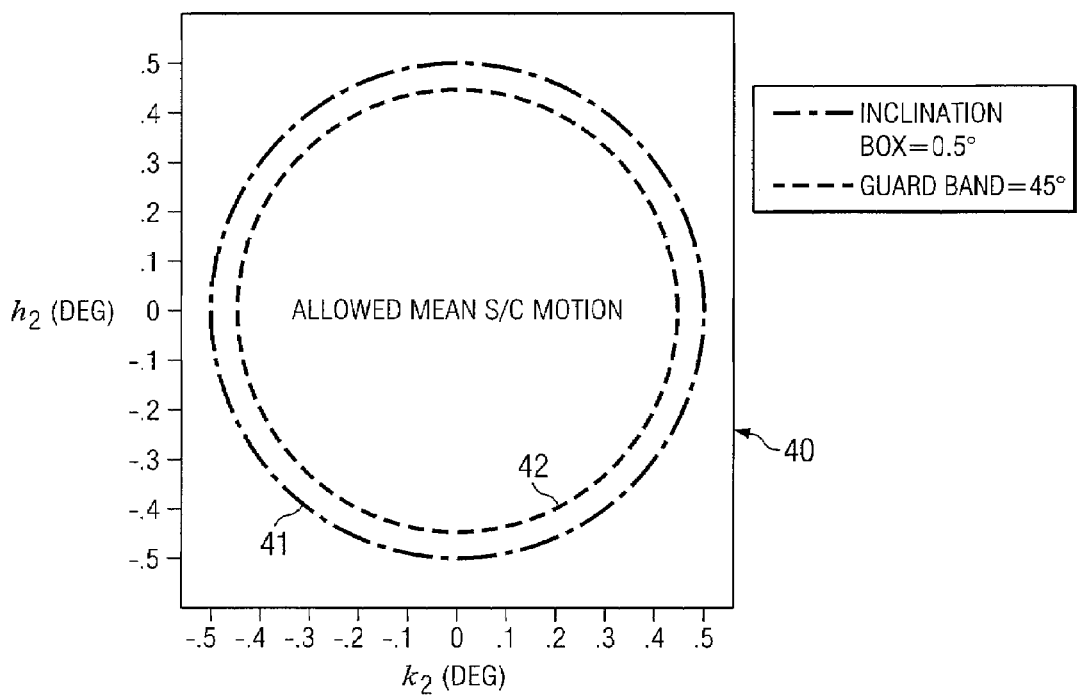
FIG. 4A is a graph of the inclination box in ($k_2, h_2$) space.

FIG. 4A is a graph 40 of the inclination box 41 in $(k_2, h_2)$ space. As mentioned earlier, the inclination box 41 is the desired limit of the inclination vector of the satellite 12. Maintaining the satellite 12 within the inclination box 41 has the effect of preventing the satellite from diverging too greatly from the desired orbital path 13, which is represented in graph 40 by the coordinate (0,0). Thus, the tighter the inclination box 41, the less the satellite 12 diverges from the desired orbital path 13. In one embodiment of the present invention, the inclination box 41 is 0.5°. The guard band 43 is the limit of the mean inclination of the satellite 12. Determining the size of the guard band can depend on un-modeled small amplitude short periodic perturbations, maneuver errors, and orbit estimation errors. Maintaining the mean inclination of the satellite 12 within guard band 42 can have the effect of virtually guaranteeing that the inclination of the satellite 12 does not exceed the inclination box 41.

Figure 4B:
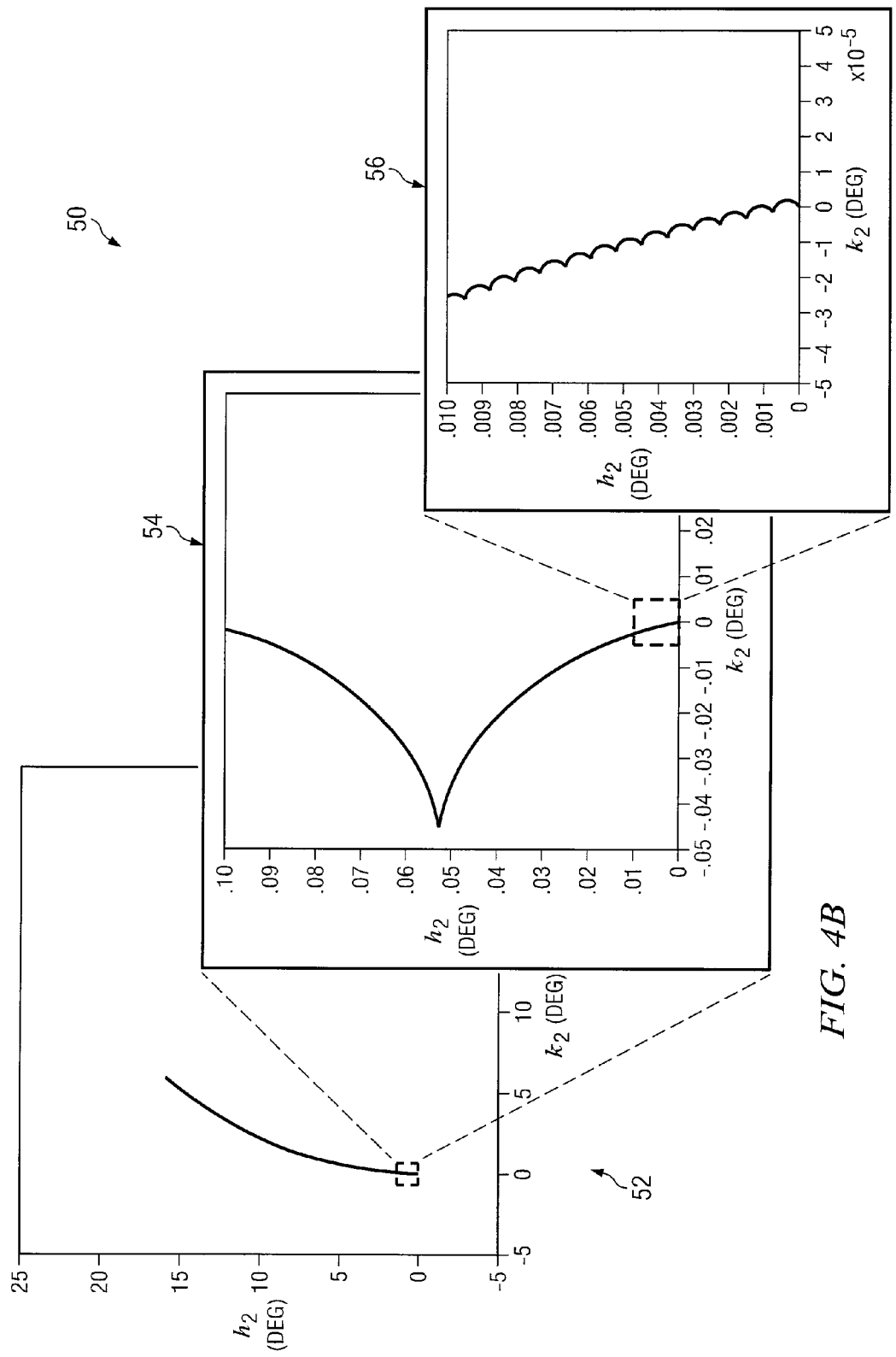
FIG. 4B is a series of graphs of the gravitational effect of the sun upon the inclination of the satellite.

FIG. 4B is a series of graphs 50 of the gravitational effect of the sun 18 upon the inclination of the satellite 12 created through the use of an orbit propagator. Graph 52 illustrates the long period perturbation of the inclination of the satellite 12 due to the gravity of the sun 18. Graph 54 illustrates the yearly perturbation of the inclination of the satellite 12 due to the gravity of the sun 18. Graph 56 illustrates the daily perturbation of the inclination of the satellite 12 due to the gravity of the sun 18.

Figure 4C:
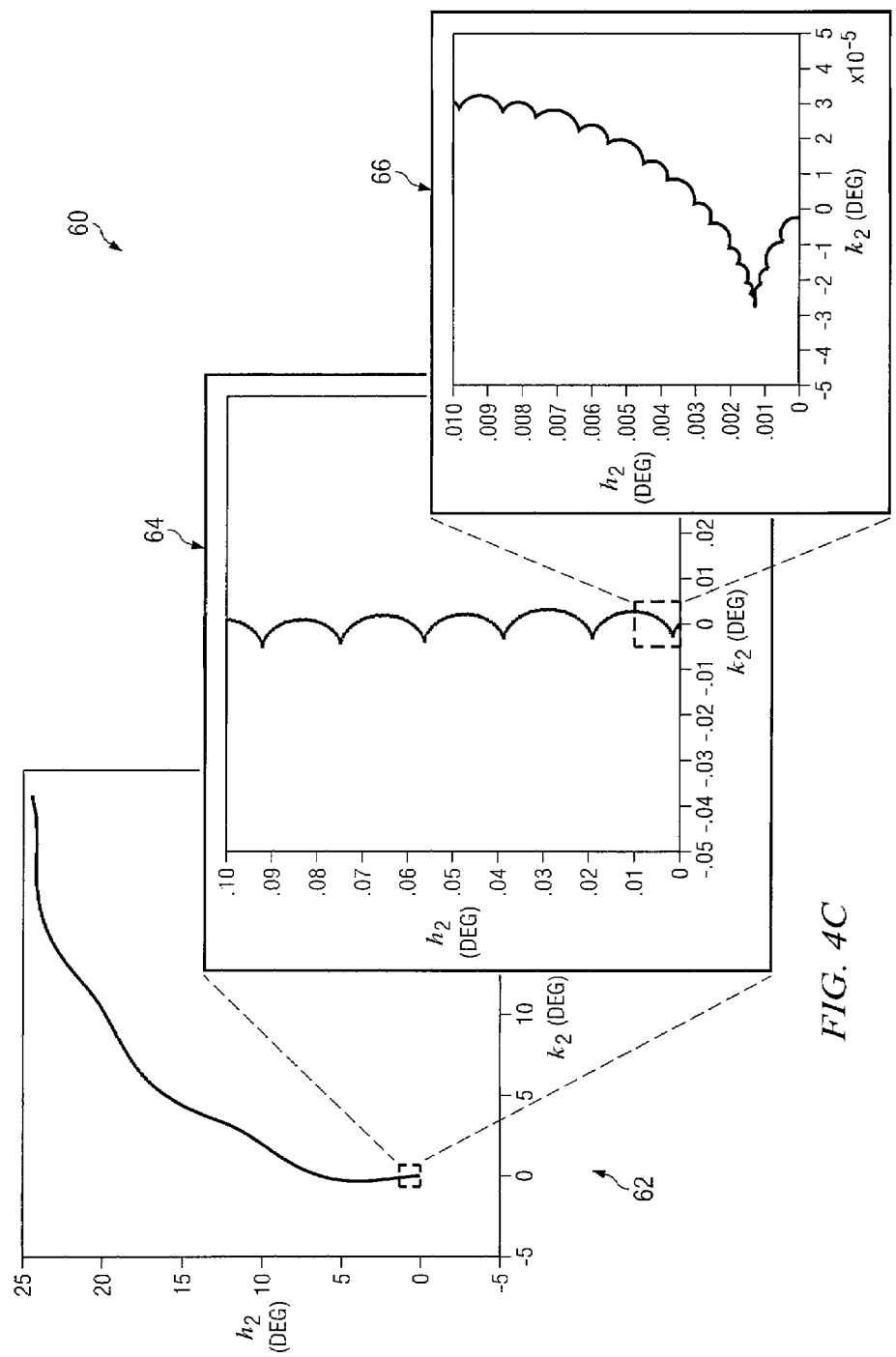
FIG. 4C is a series of graphs of the gravitational effect of the moon upon the inclination of the satellite.

FIG. 4C is a series of graphs 60 of the gravitational effect of the moon 16 upon the inclination of the satellite 12 created through the use of an orbit propagator. Graph 62 illustrates the 18.6 year and long period perturbation of the inclination of the satellite 12 due to the gravity of the moon 16. Graph 64 illustrates the monthly perturbation of the inclination of the satellite 12 due to the gravity of the moon 16. Graph 66 illustrates the daily perturbation of the inclination of the satellite 12 due to the gravity of the moon 16.

Figure 5A:
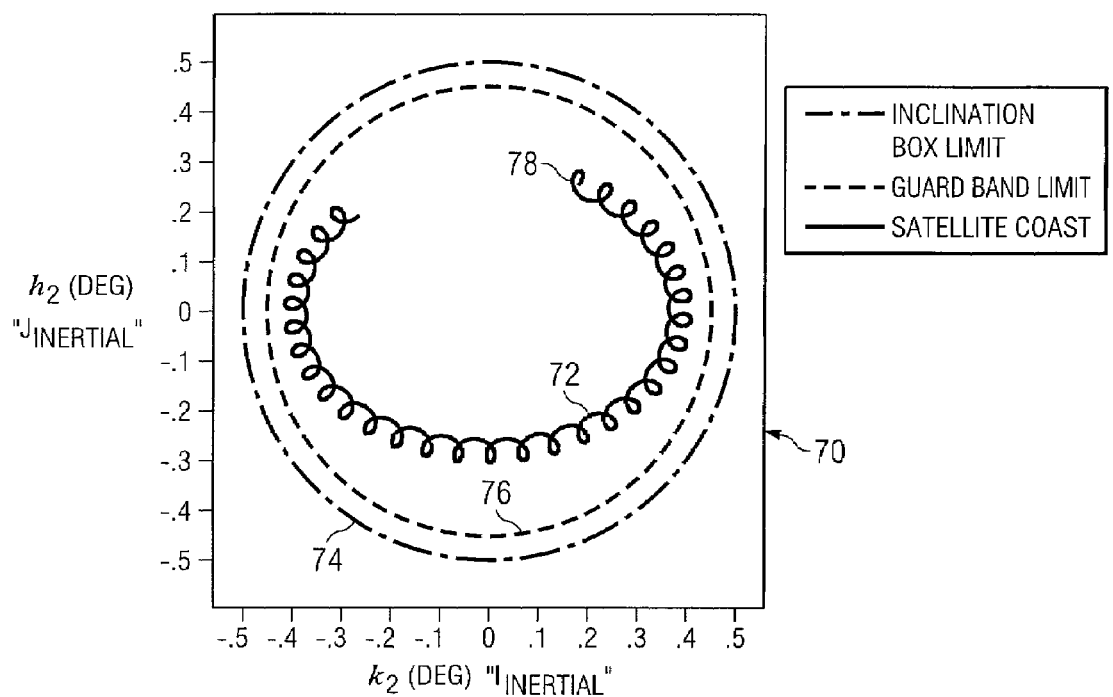

FIG. 5A is a graph 70 of the mean motion of the satellite 12 over time. The resulting motion is due to the long period gravitational effects of the sun 18 and moon 16 when inclination corrections are applied continuously by the satellite 12. Line 72 corresponds to the mean satellite motion over a period of time. The initial inclination vector of the satellite is represented by the point 78. The inclination box 74 corresponds to the inclination box 41. The guard band 76 corresponds to the guard band 42. In this plot, as well as in FIGS. 5B-5E and FIG. 6, only the long period gravitational effects of the sun 18 and moon 16 are corrected for by the correction system of the satellite (i.e., ion propulsion system, arc jet system, etc.). As can be seen from graph 70, appropriate initialization of the inclination vector of the satellite 78 along with continuous correction of the inclination of the satellite 12 causes the mean motion of the satellite 72 to stay within both the inclination box 74 and the guard band 76 as desired.

It may be appropriate to apply inclination corrections in a less frequent manner. The effects of applying larger, but less frequent corrections to the inclination of the satellite 12 can be seen in FIGS. 5B-5E.

Figure 5B:
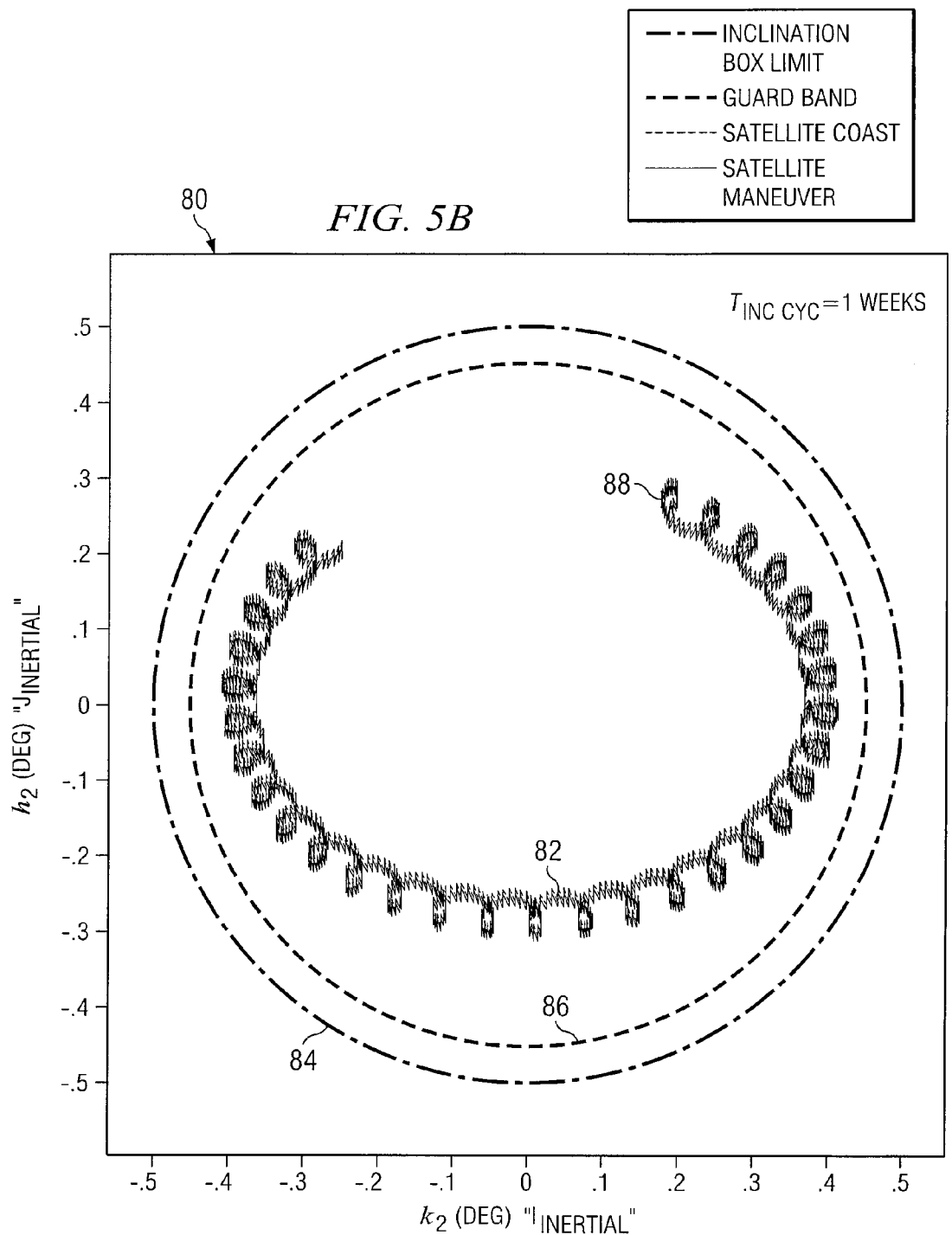

FIG. 5B is a graph 80 of the mean motion of the satellite 12 over time. The resulting motion is due to the long period gravitational effects of the sun 18 and moon 16 when inclination corrections are applied weekly by the satellite 12. Line 82 corresponds to the mean satellite motion over a period of time. The initial inclination vector of the satellite is represented by the point 88. The inclination box 84 corresponds to the inclination box 41. The guard band 86 corresponds to the guard band 42. As can be seen from graph 80, appropriate initialization of the inclination vector 88 of the satellite 12 along with application of weekly corrections to the inclination of the satellite 12 causes the mean motion of the satellite 82 to stay within both the inclination box 84 and the guard band 86 as desired.

FIG. 5C is a graph 90 of the mean motion of the satellite 12 over time. The resulting motion is due to the long period gravitational effects of the sun 18 and moon 16 when inclination corrections are applied biweekly by the satellite 12. Line 92 corresponds to the mean satellite motion over a period of time. The initial inclination vector of the satellite is represented by the point 98. The inclination box 94 corresponds to the inclination box 41. The guard band 96 corresponds to the guard band 42. As can be seen from graph 90, appropriate initialization of the inclination vector 98 of the satellite 12 along with application of biweekly corrections to the inclination of the satellite 12 causes the mean motion of the satellite 92 to stay within both the inclination box 94 and the guard band 96 as desired.

FIG. 5D is a graph 100 of the mean motion of the satellite 12 over time. The resulting motion is due to the long period gravitational effects of the sun 18 and moon 16 when inclination corrections are applied every four weeks by the satellite 12. Line 102 corresponds to the mean satellite motion over a period of time. The initial inclination vector of the satellite is represented by the point 108. The inclination box 104 corresponds to the inclination box 41. The guard band 106 corresponds to the guard band 42. As can be seen from graph 100, appropriate initialization of the inclination vector 108 of the satellite 12 along with application of corrections every four weeks to the inclination of the satellite 12 causes the mean motion of the satellite 102 to stay within both the inclination box 104 and guard band 106 as desired. However, as a result of applying periodic corrections as opposed to continuous corrections, the mean motion of the satellite 102 is no longer centered at $(k_2,h_2)=(0,0)$, but rather has noticeably shifted in the $+h_2$ direction. As can be seen from FIG. 5E, as corrections are applied even less frequently, the mean motion of the satellite shifts further in the $+h_2$ direction.

Figure 5E:
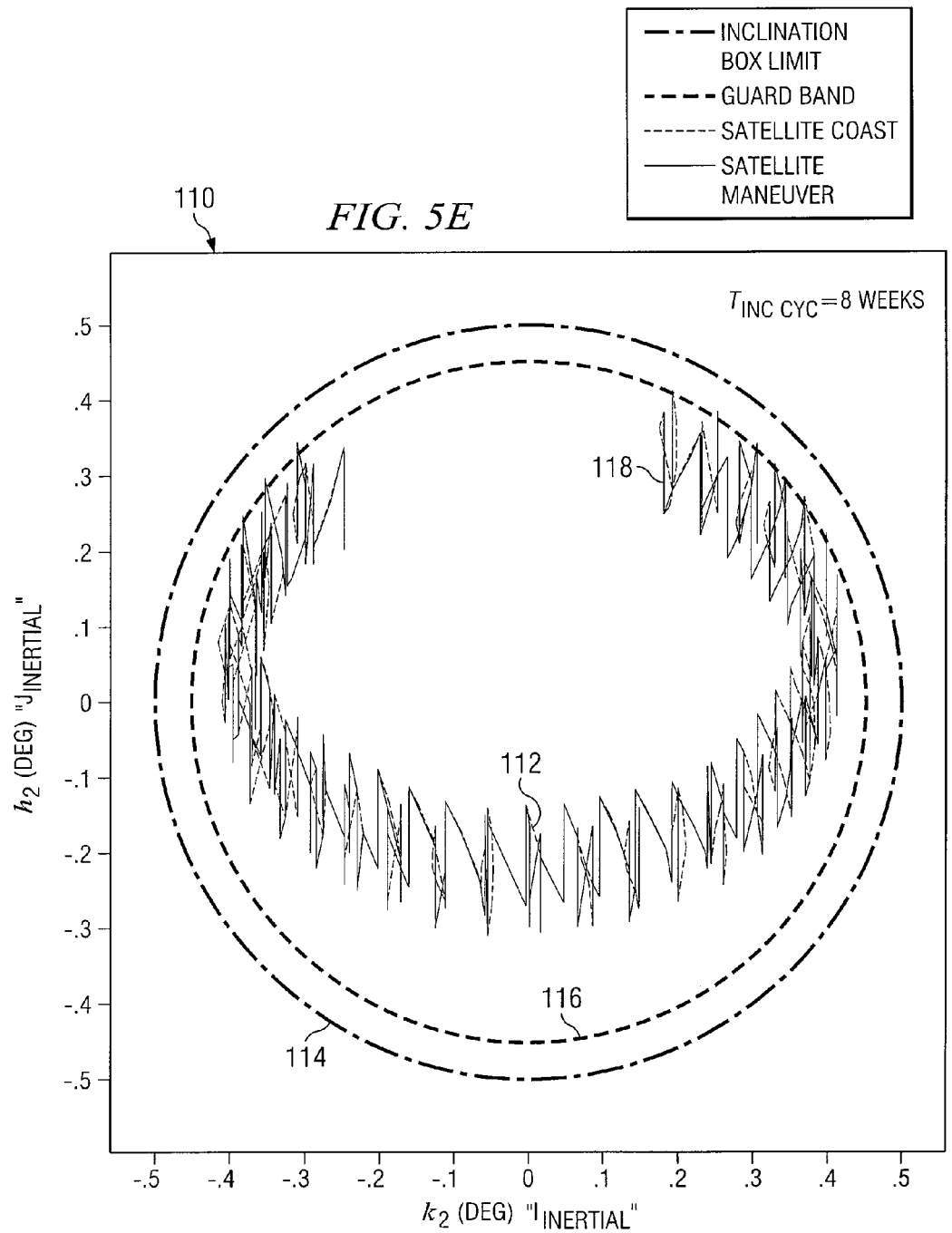

FIG. 5E is a graph 110 of the mean motion of the satellite 12 over time. The resulting motion is due to the long period gravitational effects of the sun 18 and moon 16 when inclination corrections are applied every eight weeks by the satellite 12. Line 112 corresponds to the mean satellite motion over a period of time. The initial inclination vector of the satellite is represented by the point 118. The inclination box 114 corresponds to the inclination box 41. The guard band 116 corresponds to the guard band 42. As can be seen from the mean motion of the satellite 112, because of the growth in inclination of satellite 12 between correction maneuvers, the initialization of the inclination vector 118 of the satellite 12 along with the application of inclination corrections every eight weeks does not prevent the mean motion 112 of the satellite from exceeding the guard band 106. In order to correct for the growth in inclination of the satellite 12 between correction maneuvers and thus to prevent the mean motion of the satellite 112 from exceeding the guard band 116, the initial inclination vector 118 of the satellite 12 must be altered to account for half of the inclination growth between the periodic maneuvers, as can be seen in FIG. 6.

FIG. 6 is a graph 120 of the mean motion of the satellite 12 over time resulting from the long period gravitational effects of the sun 18 and moon 16 when inclination corrections are applied every eight weeks by the satellite 12 and the inclination vector of the satellite 12 is optimally selected. Line 122 corresponds to the mean satellite motion over a period of time. The initial inclination vector of the satellite is represented by the point 128. The inclination box 124 corresponds to the inclination box 41.

The guard band 126 corresponds to the guard band 42. As can be seen from graph 120, although inclination corrections are applied every eight weeks, because the initial inclination vector 128 of the satellite 12 has been optimally selected, the mean motion of the satellite 122 does not breach the guard band 126. As a consequence of this arrangement, corrections for only the long period gravitational effects of the sun 18 and moon 16 need be applied once every eight weeks. The satellite 12 does not need to correct for the moon's 18.6 year, monthly, or daily perturbations. Additionally, the satellite 12 does not need to correct for the sun's yearly or daily perturbations. With such an arrangement, this embodiment provides the benefit of allowing the satellite 12 to use less fuel to maintain itself within the inclination box 124 and guard band 126 than prior methods.

FIG. 7 is a flow chart of the steps of the preferred embodiment of the geostationary stationkeeping method performed by a computer 30. These steps may be performed by orbit correction application 35 of FIG. 3 or by other suitable apparatus. At step 200, the direction of the long period contribution of the gravitational force of the sun 18 is determined. At step 210, the direction of the long period contribution of the gravitational force of the moon 16 is determined. At step 220, the effect of the moon's 18.6 year perturbation on the inclination and right ascension of the satellite 12 at the beginning of the stationkeeping operation is determined. At step 230, an initial inclination vector of the satellite 12 is determined at the beginning of the stationkeeping operation, accounting for the effect of the 18.6 year moon perturbation and the direction of the long period sun and moon gravitational force contributions on the satellite 12 such that the inclination vector of the satellite does not exceed a predetermined value while the satellite is in orbit. At step 240, a maneuver strategy is determined for preventing the inclination vector of the satellite 12 from exceeding the predetermined value by correcting for only the long period effects of the sun 18 and moon 16 while the satellite 12 is in orbit. At step 250, a maneuver is performed on the satellite 12 according to the maneuver strategy determined at step 240.

Although the present invention and its advantages have been described in detail, it should be understood that various changes, substitutions, and alterations can be made therein without departing from the spirit and scope of the invention as defined by the appended claims.

What is claimed is:

1. A geostationary stationkeeping method, comprising:
   determining a gravitational force of the sun on a satellite at a beginning of a stationkeeping operation;
   determining a gravitational force of the moon on the satellite at the beginning of the stationkeeping operation;
   determining an initial inclination vector of the satellite that prevents the satellite from exceeding a predefined inclination box while the satellite is in orbit, wherein the initial inclination vector accounts for a first set of one or more perturbations affecting the orbit of the satellite, wherein the first set of one or more perturbations affecting the orbit of the satellite comprises an 18.6 year moon perturbation;
   determining a guard band for a mean inclination of the satellite, wherein a size of the guard band is calculated based on unmodeled small amplitude short period perturbations, maneuver error, and orbit estimation error, the guard band located within the inclination box;
   determining a maneuver strategy to correct for a second set of one or more perturbations affecting the orbit of the satellite without accounting for the first set of one or more perturbations affecting the orbit of the satellite and to maintain a mean inclination of the satellite within the guard band to guarantee the inclination of the satellite does not exceed the inclination box; and
   performing a maneuver on the satellite according to the maneuver strategy.

2. The geostationary stationkeeping method of claim 1, wherein the second set of one or more perturbations affecting the orbit of the satellite comprises a long period perturbation of the moon.

3. The geostationary stationkeeping method of claim 1, wherein the second set of one or more perturbations affecting the orbit of the satellite comprises a long period perturbation of the sun.

4. The geostationary stationkeeping method of claim 1, wherein the maneuver is applied periodically.

5. The geostationary stationkeeping method of claim 1, wherein the maneuver is applied continuously.

6. The geostationary stationkeeping method of claim 1, wherein the maneuver is applied at least once every eight weeks.

7. The geostationary stationkeeping method of claim 1, wherein the inclination vector of the satellite comprises a vector in the direction of the angle of right ascension of the ascending node of the satellite's orbit with a magnitude of the inclination of the orbit.

8. The geostationary stationkeeping method of claim 1, wherein the inclination vector of the satellite does not exceed a first predetermined value while the satellite is in orbit.

9. The geostationary stationkeeping method of claim 8, wherein the mean inclination vector of the satellite does not exceed a second predetermined value that is lower than the first predetermined value while the satellite is in orbit.

10. A geostationary stationkeeping method, comprising:
  determining a direction of the sun gravitational force on a satellite at a beginning of a stationkeeping operation;
  determining a direction of the moon gravitational force on a satellite at the beginning of the stationkeeping operation;
  determining an effect of an 18.6 year moon perturbation on an inclination and a right ascension of the satellite at the beginning of the stationkeeping operation;
  determining an initial inclination vector of the satellite that prevents the satellite from exceeding a predefined inclination box while the satellite is in orbit, the initial inclination vector accounting for the effect of the 18.6 year moon perturbation and the direction of the sun and moon gravitational forces on the satellite;
  determining a guard band for a mean inclination of the satellite, wherein a size of the guard band is calculated based on unmodeled small amplitude short period perturbations, maneuver error, and orbit estimation error, the guard band located within the inclination box;
  determining a maneuver strategy for preventing the inclination vector of the satellite from exceeding a first predetermined value by correcting for only the long period effects of the sun and moon while the satellite is in orbit and to maintain a mean inclination of the satellite within the guard band to guarantee the inclination of the satellite does not exceed the inclination box; and
  performing periodically a maneuver on the satellite according to the maneuver strategy.

11. The geostationary stationkeeping method of claim 10, wherein the maneuver is applied at least once every eight weeks.

12. The geostationary stationkeeping method of claim 10, wherein the mean inclination vector of the satellite does not exceed a second predetermined value that is lower than the a first predetermined value while the satellite is in orbit.

13. An apparatus comprising:
  a computer-readable medium; and
  program code stored on the computer-readable medium and operable, when executed to:
    determine a gravitational force of the sun on a satellite at a beginning of a stationkeeping operation;
    determine a gravitational force of the moon on the satellite at the beginning of the stationkeeping operation;
    determine an initial inclination vector of the satellite that prevents the satellite from exceeding a predefined inclination box while the satellite is in orbit, wherein the initial inclination vector accounts for a first set of one or more perturbations affecting the orbit of the satellite, wherein the first set of one or more perturbations affecting the orbit of the satellite comprises an 18.6 year moon perturbation;
    determining a guard band for a mean inclination of the satellite, wherein a size of the guard band is calculated based on unmodeled small amplitude short period perturbations, maneuver error, and orbit estimation error, the guard band located within the inclination box;
    determine a maneuver strategy to correct for a second set of one or more perturbations affecting the orbit of the satellite without accounting for the first set of one or more perturbations affecting the orbit of the satellite and to maintain a mean inclination of the satellite within the guard band to guarantee the inclination of the satellite does not exceed the inclination box; and
    perform a maneuver on the satellite according to the maneuver strategy.

14. The apparatus of claim 13, wherein the second set of one or more perturbations affecting the orbit of the satellite comprises a long period perturbation of the moon.

15. The apparatus of claim 13, wherein the second set of one or more perturbations affecting the orbit of the satellite comprises a long period perturbation of the sun.

16. The apparatus of claim 13, wherein the maneuver is applied periodically.

17. The apparatus of claim 13, wherein the maneuver is applied at least once every eight weeks.

18. The apparatus of claim 13, wherein the inclination vector of the satellite comprises a vector in the direction of the angle of right ascension of the ascending node of the satellite's orbit with a magnitude of the inclination of the orbit.

19. The apparatus of claim 13, wherein the inclination vector of the satellite does not exceed a first predetermined value while the satellite is in orbit.

20. The apparatus of claim 19, wherein the mean inclination vector of the satellite does not exceed a second predetermined value that is lower than the first predetermined value while the satellite is in orbit.

* * * * *